United States Patent [19]

Lee

[11] Patent Number: 4,963,904
[45] Date of Patent: Oct. 16, 1990

[54] PORTABLE CAMERA SUPPORT ASSEMBLY

[76] Inventor: Chun Mao Lee, No. 22, Alley 7, Lane 428, Chung Cheng N. Rd., San Chung City, Taipei Hsien, Taiwan

[21] Appl. No.: 409,327

[22] Filed: Sep. 19, 1989

[51] Int. Cl.$^5$ .............................................. G03B 29/00
[52] U.S. Cl. ...................................... 354/82; 352/243; 224/265; 224/201; 224/908; 354/293
[58] Field of Search .......................... 354/81, 82, 293; 352/243; 224/201, 265, 266, 908; 248/187

[56] References Cited

U.S. PATENT DOCUMENTS 4,244,500 1/1981 Fournier ............................ 354/81 X
4,437,753 3/1984 Dunn ................................. 354/82 X

*Primary Examiner*—Brian W. Brown
*Attorney, Agent, or Firm*—Morton J. Rosenberg; David I. Klein

[57] ABSTRACT

A portable camera support assembly having an adjustment block, a support piece, a shoulder rest, a camera mount, a lengthwise-extendible hand grip, a body rest, a mount adjustment knob and a torsional spring assembly. The support assembly fixes to a lower end of a camera using the camera mount. The shoulder rest and body rest are used to support and balance the camera at the shoulder and upper body of the user respectively. The adjustment block, hand grip and mount adjustment knob allow the user to position the camera in a wide range of orientations during use and also allow the support assembly to be folded up when not in use. Additionally, the hand grip and body rest can be removed and a retractable monopole fixed to the adjustment block for support of the camera remote from the user.

2 Claims, 7 Drawing Sheets

PORTABLE CAMERA SUPPORT ASSEMBLY

BACKGROUND OF THE INVENTION

This invention relates to a camera support assembly, and in particular relates to a camera support which does not require the use of hands and which is adjustable to a very wide range of positions.

In the past, camera supports have been available, such as shoulder rests or shoulder straps, but these conventional types of supports each have their own shortcomings with regard to ease of operation. For instance, with a shoulder rest, the weight of the camera is supported, but the camera must be balanced by the user's hands. Shoulder rests also must be used in conjunction with a shoulder strap to protect against accidental droppage. With a shoulder strap, the camera is ensured against accidental droppage, but the user is not provided with any extra flexibility in the use of the hands; i.e., the user must use at least one hand to support the camera and usually the other hand to steady the camera.

It is the purpose of this present invention, therefore, to mitigate and/or obviate the above-mentioned drawbacks in the manner set forth in the detailed description of the preferred embodiment.

SUMMARY OF THE INVENTION

A primary objective of this invention is to provide a portable camera assembly which eliminates the necessity for the user to constantly use his hands.

Another objective of this invention is to provide such a portable camera support assembly which is adjustable to a wide range of positions.

Further objectives and advantages of the present invention will become apparent as the following description proceeds, and the features of novelty which characterize the invention are pointed out with particularity in the claims annexed to and forming a part of this invention.

DETAILED-DESCRIPTION OF THE PREFERRED EMBODIMENT

Figure 1:
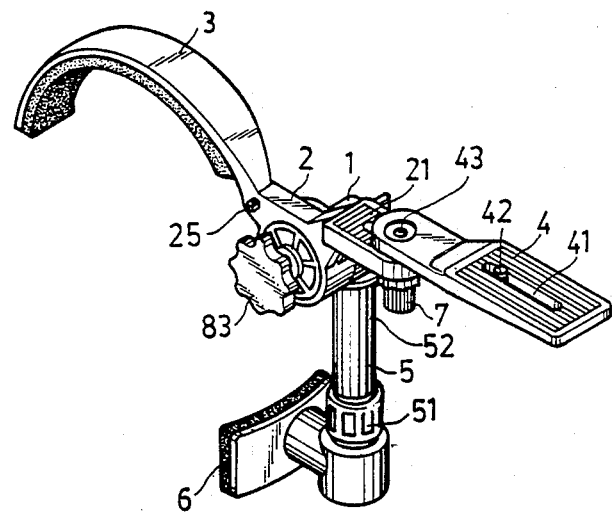
FIG. 1 is a perspective view of a portable camera support assembly in accordance with the present invention.
Figure 2:
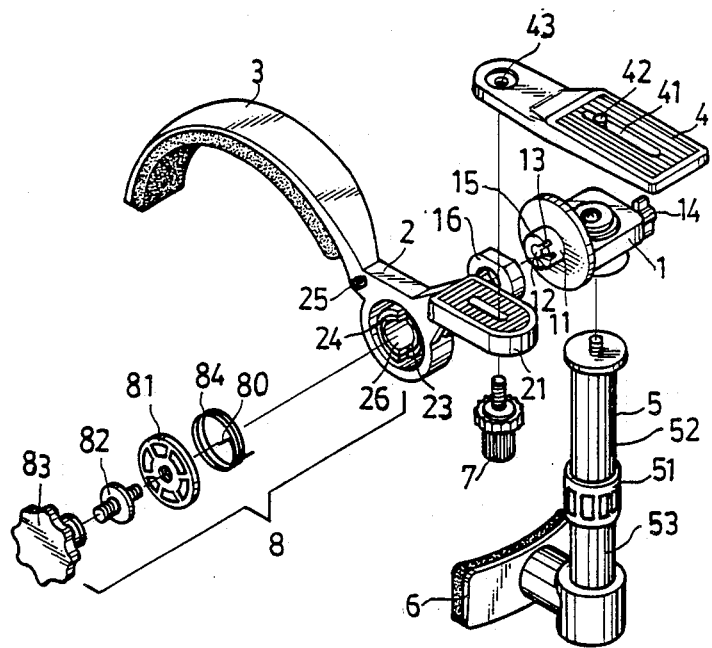
FIG. 2 is an exploded view of a portable camera support assembly in accordance with the present invention.

Referring to FIGS. 1 and 2, it can be seen that a portable camera support assembly of the present invention comprises the combination of an adjustment block 1, a support piece 2, a shoulder rest 3, a camera mount 4, a lengthwise-extendible hand grip 5, a body rest 6, a mount adjustment knob 7, and a torsional spring assembly 8.

The portable camera support assembly is supported and balanced by the user's body in two places; namely, at the shoulder and the upper body of the user. The support assembly fixedly engages at a lower end of a camera by means of a slide bolt 42, which is slidable in a slot 41 on the camera mount 4.

Figure 7:
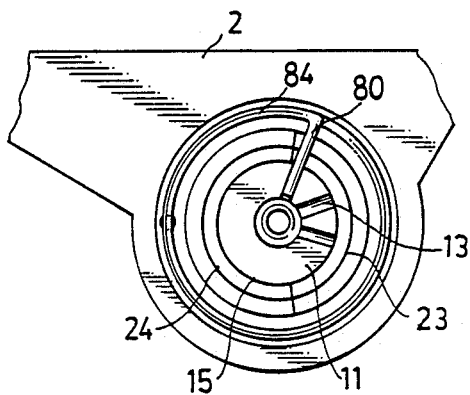
FIG. 7 is a close-up cutaway elevational view of one end of the support piece in accordance with the portable camera support assembly of the present invention, showing the operation of the torsional spring, engagement block, and inner and outer sleeves.
Figure 8:
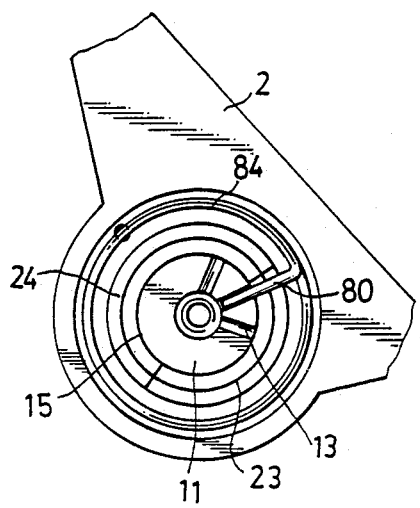
FIG. 8 is a view similar to FIG. 7, but with the support piece shown at a different angular orientation.

Referring to FIGS. 2, 7 and 8, it can be seen that the adjustment block 1 has a rotational engagement block 11 thereon. This engagement block 11 includes a cylindrical protrusion 15 which is integral with a circular wall. The cylindrical protrusion 15 has a central threaded hole 12 and a plurality of engagement slots 13 thereon. At an opposite end of the adjustment block 1 to the engagement block 11, there is provided a tightening knob 14 for tightening the adjustment block 1 onto the hand grip 5.

Referring back to FIGS. 1, 2 and 4, the support piece 2 can be seen to comprise the rigid shoulder rest 3, a camera platform 21, an annular support portion 26 and a pair of strap fixing lugs 25 for fixing a shoulder strap 9 to the shoulder rest 3 via a pair of fixing rings 91 at each end of the shoulder strap 9. The shoulder rest 3 is padded on a lower surface thereof for the comfort of the user.

The camera mount 4 has a hole 43 proximate to one end thereof with the lengthwise slot 41 and the slide bolt 42 at an opposite end to the hole 43. The slide bolt 42 is engageable with the lower end of the user's camera.

The lengthwise-extendible hand grip 5 is composed of an upper slidable cylindrical column 52 and a lower slidable cylindrical column 53. The lower cylindrical column 53 is slidable in the upper cylindrical column 52, and the hand grip 5 has an adjustment ring 51 thereon for clamping the lower cylindrical column 53 in place with respect to the upper cylindrical column 52. In FIG. 2, the hand grip 5 is shown in an extended position, whereas in FIGS. 1, 3, 4, 5 and 6, the hand grip is not in the extended position.

Figure 3:
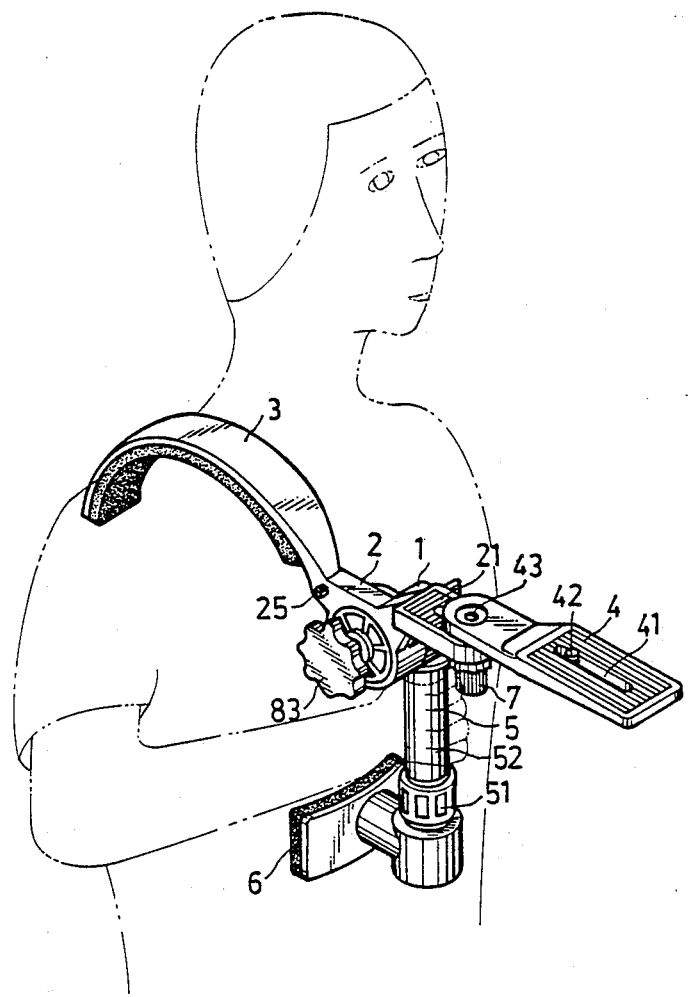
FIG. 3 is a perspective working view of a portable camera support assembly in accordance with the present invention.
Figure 4:
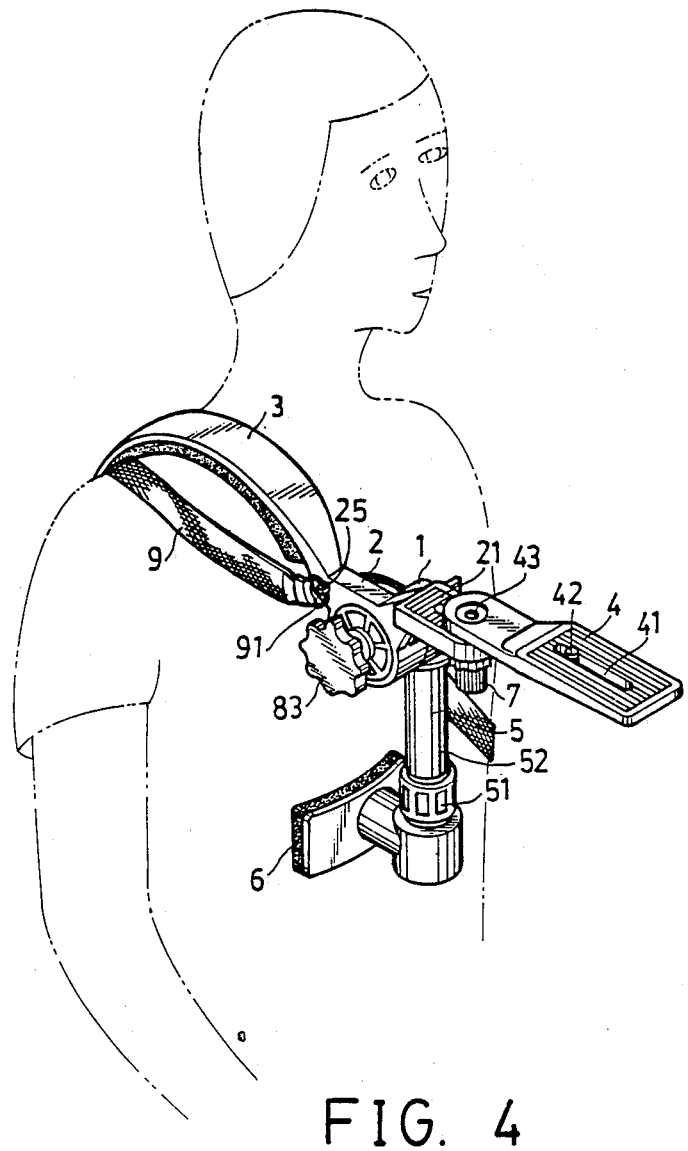
FIG. 4 is a view similar to FIG. 3, but also showing an added safety strap.

The body rest 6 is fixed at a lower portion of the lower cylindrical column 53 and has a curved portion for resting against the user's body, as seen in FIGS. 3 and 4.

Figure 5:
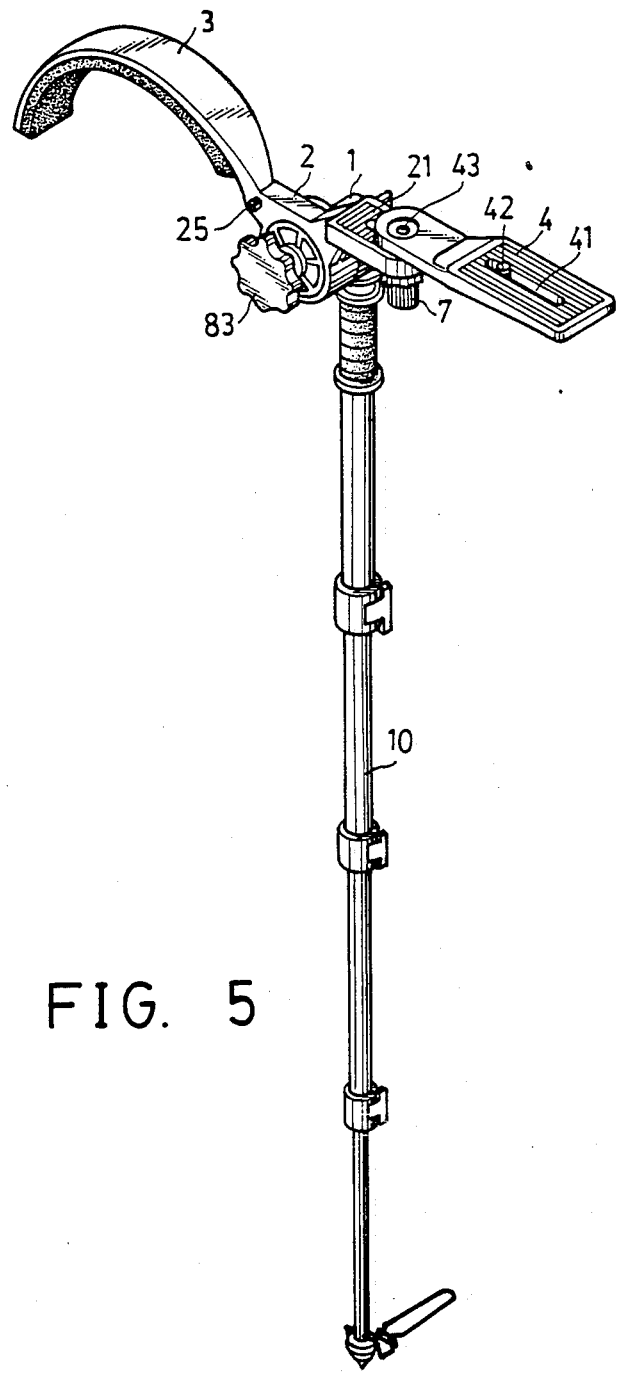
FIG. 5 is a perspective view of the portable camera support assembly being used in conjunction with a retractable monopole rather than a hand-grip.

Alternatively, as seen in FIG. 5, the lengthwise-extendible hand grip 5 and body rest 6 are removed and a retractable monopole 10 is fixed to the adjustment block 1 for support of the camera remote from the user.

The mount adjustment knob 7 is provided for adjusting the radial position of the camera mount 4. The mount adjustment knob 7 comprises a lower knob portion and an upper bolt portion which engages with the hole 43 of the camera mount 4.

The torsional spring assembly 8 comprises a torsional spring 84 having a pair of inwardly directed ends 80 thereon, an action plate 81, a two-way bolt 82, an adjustment knob 83, an outer half sleeve 24, and an inner half sleeve 23. The two-way bolt 82 is threadedly engageable with the adjustment knob 83 on one side and respectively with the action plate 81 and the threaded hole 12 on the other side thereof. One end 80 of the torsional spring 84 is fixed on the support piece 2 and the other end 80 is fixed in one of the plurality of engagement slots 13 of the cylindrical protrusion 15.

Figure 6:
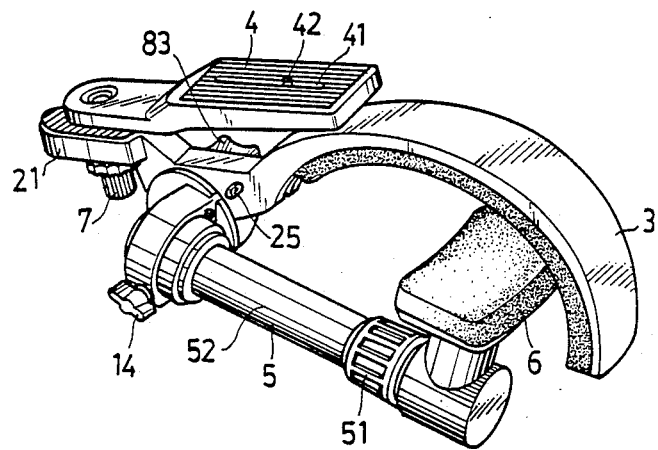
FIG. 6 is a perspective view of the portable camera support assembly in folded position.

As seen best in FIG. 6, in addition to providing a wide range of positions to the user while in use, the adjustment ring 51, the tightening knob 14, the mount adjustment knob 7 and the adjustment knob 83 can be used in conjunction with each other so as to provide the user with foldability for storage purposes.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A portable camera support assembly which is supported and balanced by a user's body and releasably coupled to an underside portion of a camera, comprising the combination of:

an adjustment block (1) having an engagement block (11) formed on one end thereof, said engagement block (11) including a circular wall from which extends an integrally formed cylindrical protrusion (15), said cylindrical protrusion (15) having a centrally located threaded opening (12) formed therein;

a support member (2) pivotally coupled to said adjustment block (1) by a torsional spring assembly (8), said support member (2) including (a) an annular support portion (26) adapted to receive in a first direction said cylindrical protrusion (15) therein, (b) a rigid padded shoulder rest portion (3) extending from said annular support portion (26) in a second direction, said second direction being transverse said first direction, and (c) a camera platform portion (21) extending from said annular support portion (26) in a direction opposite said second direction, said torsion spring assembly (8) including (a) a torsional spring (84) disposed within said annular support portion (26) of said support member (2) and having one end (80) coupled to said cylindrical protrusion (15) and an opposing end (80) coupled to said annular support portion (26), said one end (80) being received within one of a plurality of slotted openings (13) formed in said cylindrical protrusion (15), and (b) an adjustment knob (83) coupled to said cylindrical protrusion (15) by a double ended bolt (82) passing through a plate member (81) for threaded coupling with said threaded opening (12) of said cylindrical protrusion (15);

a camera mount (4) coupled to said camera platform portion (21) of said support member (2) by a fastening member (7), said camera mount (4) having a slotted through opening formed therein for receiving a slide bolt (42) therethrough to provide an adjustable coupling with said underside of said camera;

a lengthwise-extendable hand grip (5) threadedly coupled to a bottom portion of said adjustment block (1) for releasable coupling therewith, said lengthwise-extendable hand grip (5) being defined by a lower cylindrical column (53) telescopically received within an upper cylindrical column (52), said lengthwise-extendable hand grip (5) including a clamping ring (51) for releasably securing said lower cylindrical column (53) to said upper cylindrical column (52);

a body rest member (6) having an arcuate portion on one end thereof and being fixedly coupled to a lower portion of said lower cylindrical column (53) on an opposing end; and, a pair of strap fixing lugs (25) coupled to opposing sides of said support member (2) for securing opposing ends of a shoulder strap (9) thereto.

2. The portable camera support assembly as recited in claim 1 further comprises a telescopically extendable monopole (1) adapted to be threadedly coupled to said adjustment block (1) in place of said lengthwise-extendable hand grip (5).

* * * * *